US008566252B2

(12) United States Patent
Harding

(10) Patent No.: US 8,566,252 B2
(45) Date of Patent: Oct. 22, 2013

(54) METHOD AND SYSTEM FOR EVALUATING TRUSTWORTHINESS

(75) Inventor: Benjamin L. Harding, Boulder, CO (US)

(73) Assignee: Benjamin L. Harding, Boulder, CO (US)

( * ) Notice: Subject to any disclaimer, the term of this patent is extended or adjusted under 35 U.S.C. 154(b) by 1183 days.

(21) Appl. No.: 11/975,140

(22) Filed: Oct. 16, 2007

(65) Prior Publication Data

US 2008/0109451 A1    May 8, 2008

Related U.S. Application Data

(60) Provisional application No. 60/852,499, filed on Oct. 17, 2006.

(51) Int. Cl.
*G06Q 10/00* (2012.01)

(52) U.S. Cl.
USPC ............................................ 705/319; 705/1.1

(58) Field of Classification Search
USPC ................................. 705/1, 319, 1.1
See application file for complete search history.

(56) References Cited

U.S. PATENT DOCUMENTS

| 5,960,441 | A | 9/1999 | Bland et al. | 707/104 |
|---|---|---|---|---|
| 5,995,974 | A | 11/1999 | Anton et al. | 707/103 |
| 5,999,263 | A | 12/1999 | Deck et al. | 356/359 |
| 6,073,138 | A | 6/2000 | De l'Etraz et al. | 707/104 |
| 6,324,541 | B1 | 11/2001 | De l'Etraz et al. | 707/104 |
| 7,433,826 | B2 | 10/2008 | Korosec | 705/1 |
| 2002/0023132 | A1 | 2/2002 | Tornabene et al. | 709/205 |
| 2004/0148275 | A1* | 7/2004 | Achlioptas | 707/3 |
| 2005/0021750 | A1 | 1/2005 | Abrams | 709/225 |

(Continued)

FOREIGN PATENT DOCUMENTS

WO   WO-2006019752 A1   2/2006

OTHER PUBLICATIONS

Kautz, Henry, Bart Selman and Mehul Shah. "Referral Web: Combining Social Networks and Collaborative Filtering". Communications of the ACM, Mar. 1997/vol. 40 No. 3.*
Beth et al., "Valuation of Trust in Open Networks", *Lecture Notes in Computer Science*, vol. 875 (1994).
Branchaud et al., "χTust: A Scalable Trust Management Infrastructure", Second Annual Conference on Privacy, Security and Trust, http://dev.hil.unb.ca/Texts/PST/pdf/branchaud.pdf; (2004).

(Continued)

*Primary Examiner* — Gabrielle McCormick
(74) *Attorney, Agent, or Firm* — Occhiuti & Rohlicek LLP

(57) ABSTRACT

Disclosed are a method and system for evaluating the trustworthiness of a target person by a user. The method and system include providing a network comprising a plurality of nodes connected by a plurality of directed links, wherein each node in the plurality of nodes is associated with a person and each link in the plurality of links connects from a first node to a second node. The link is associated with a trusting relationship from a first person associated with the first node to a second person associated with the second node, and wherein the user is associated with at least one node in the plurality of nodes. A continuous path from the user to the target person is identified, wherein the continuous path begins at a node in the network that is associated with the user and ends at a node in the network that is associated with the target person, the continuous path traversing links from their first node to their second node, the continuous path termed a trust path, thereby providing an indication of the trustworthiness of the target person.

41 Claims, 5 Drawing Sheets

(56) References Cited

U.S. PATENT DOCUMENTS

| | | | |
|---|---|---|---|
| 2005/0154913 A1* | 7/2005 | Barriga et al. | 713/201 |
| 2005/0171955 A1* | 8/2005 | Hull et al. | 707/10 |
| 2005/0283753 A1* | 12/2005 | Ho et al. | 717/102 |
| 2006/0009994 A1* | 1/2006 | Hogg et al. | 705/1 |
| 2006/0041543 A1 | 2/2006 | Achlioptas | |
| 2006/0173963 A1* | 8/2006 | Roseway et al. | 709/206 |

OTHER PUBLICATIONS

Donath et al. "Public Display of Connection" *BT Technology Journal*, 22(4):71-82 (2004).

Genkina et al., "Re-Embedding Existing Social Networks into Online Experiences to Aid in Trust Assessment" http://ssrn.com/abstract=707139 (2005).

* cited by examiner

Social Network Representation

Complete Path a:d

Computer Network Configuration

Node Creation

Link Creation**

Network Search**

Node Attributes

Sub-network "blue"

Link Attributes**

METHOD AND SYSTEM FOR EVALUATING TRUSTWORTHINESS

RELATED APPLICATIONS

This application claims priority to U.S. Ser. No. 60/852,499, filed Oct. 17, 2006. The contents of this application are incorporated herein by reference in their entirety.

FIELD OF THE INVENTION

The invention generally relates to evaluation of persons as part of social or commercial transactions.

BACKGROUND OF THE INVENTION

From the earliest times people have established methods of evaluating the trustworthiness of an individual or organization (a natural or legal person). One common method for doing so is a formal organization that evaluates persons and vouches for their trustworthiness or provides objective information with which another person can perform its own evaluation. Examples of such organizations are Dun and Bradstreet, Consumers Union, The Better Business Bureau, the American Automobile Association and Michelin. People have also used informal means to establish the trustworthiness of a person by seeking recommendations from a friend, relative or co-worker.

Since the widespread adoption of the internet for communications and publishing, examples of formal evaluation organizations have become too numerous to count—an internet search on the term "hotel ratings" returns more than 50 million results. Commercial use of the internet by individuals has grown at a similar rate—a survey performed in 2005 shows that about one in six adult American internet users, or 25,000,000 people, have sold something on line. No single organization, much less a single person, can reliably evaluate more than a small fraction of these sellers by conventional means.

SUMMARY OF THE INVENTION

In one aspect, the invention provides a method of evaluating the trustworthiness of a target person by a user. The method includes providing a network comprising a plurality of nodes connected by a plurality of directed links, wherein each node in the plurality of nodes is associated with a person and each link in the plurality of links connects from a first node to a second node. The link is associated with a trusting relationship from a first person associated with the first node to a second person associated with the second node, and wherein the user is associated with at least one node in the plurality of nodes. A search is conducted for a continuous path from the user to the target person, wherein the continuous path begins at a node in the network that is associated with the user and ends at a node in the network that is associated with the target person, the continuous path traversing links from their first node to their second node, the continuous path termed a trust path, the presence or absence of such continuous path thereby providing an indication of the trustworthiness of the target person. When one or more links expressing distrust terminate at the node represented by the target person, a search is optionally conducted for a continuous path from the user to one or more nodes representing a person expressing distrust of the target person. The presence of such a continuous path provides an indication trustworthiness of the person expressing distrust of the target person. In some embodiments, the identity of any one person associated with any one node of the plurality of nodes is concealed from all persons except those persons associated with nodes connected to the one node.

In some embodiments, the existence of any one link in the trust network is concealed from all persons except the person associated with the first node connected to that one link.

In some embodiments, at least one second node in the network serves also as a first node and is in turn connected to at least one other node in the network, thereby extending the network indefinitely.

In some embodiments, the network includes at least one link associated with a trusting relationship from the second person to the first person.

In some embodiments, one or more attributes are associated with one or more of the plurality of nodes. In some embodiments, one or more attributes associated with the nodes included in the trust path are used to refine the indication of trustworthiness provided by the trust path. In some embodiments, one or more attributes associated with one or more of the plurality of nodes when present are used to select a subset of the plurality of nodes which along with their connected links comprise a sub-network which becomes the domain for identifying the trust path.

In some embodiments, one or more attributes are associated with one or more of the plurality of links. In some embodiments, one or more attributes associated with the links included in the trust path are used to refine the indication of trustworthiness provided by the trust path. In some embodiments, one or more attributes associated with the one or more links are used to select a subset of the plurality of links which along with their connected nodes comprise a sub-network which becomes the domain for identifying the trust path.

In some embodiments, an attribute associated with one or more of the plurality of links represents distrust and provides an explicit indication of lack of trustworthiness of the person associated with the second node of that link.

In some embodiments, at least part of the indication of trustworthiness is determined by the nature of the trust path.

In some embodiments, the indication of trustworthiness is determined by the nature of the trust path.

In some embodiments, at least part of the indication of trustworthiness is determined by the structure of the network.

In some embodiments, the indication of trustworthiness is determined by the structure of the network.

In some embodiments, the identity or personal information of the persons associated with at least one of the nodes is masked.

In some embodiments, masking is by using an alias.

In some embodiments, the identity and personal information of the persons associated with the nodes are masked. In some embodiments, masking is by using an alias. In some embodiments, an alias includes a unique personal identifier. In some embodiments, an alias includes a domain name and user name. In some embodiments, an alias includes a complete e-mail address. In some embodiments, an alias includes a trade name. In some embodiments, a unique identifier is provided for use as an alias for temporary use or for one-time-use.

Also provided by the invention is a method of expanding a trust network. The method includes providing a network comprising a plurality of nodes connected by a plurality of directed links, wherein each node in the plurality of nodes is associated with a person and each link in the plurality of links connects from a first node to a second node, the link being associated with a trusting relationship from a first person associated with the first node to a second person associated with the second node. The method additionally includes inputting from a person not associated with an existing node in the network at least one alias and other information necessary for security purposes or for analytical purposes or for other purposes, creating a node in the network associated with the person, inputting from a person associated with an existing first node on the network trustworthiness information for a person associated with an existing second node on the network and other information necessary for security purposes or for analytical purposes or for other purposes, and forming a link connecting from the first node associated with the first person and the existing second node associated with the second person, thereby expanding the trust network.

Also provided by the invention is a method for protecting the operator or manager of a trust network from legal claims arising from expressions of distrust captured as attributes of links of the trust network. The method includes using insurance against the legal claims and limiting expressions of distrust to terms that reduce the risk of legal liability to a level consistent with the nature of the insurance. For example, the method could restrict expressions of distrust to a selection of opinions of a form likely to avoid liability or to lead to small awards, while providing insurance in an amount commensurate with the expected cost of defending probable claims and paying probable awards.

In a further aspect, the invention provides a system for evaluating the trustworthiness of a target person by a user. The system includes a database, the database including a computer-readable representation of a network, the network representation comprising representations of a plurality of nodes and representations of a plurality of directed links, and representations of the connections of the nodes by the links. Each node in the plurality of nodes is associated with a person and each link in the plurality of links connects from a first node to a second node, the link being associated with a trusting relationship from a first person associated with the first node to a second person associated with the second node; and wherein the user is associated with at least one node in the plurality of nodes and the persons and their associations with nodes are represented in the database.

The system additionally includes a computer program product, the product comprising instructions operable to cause a programmable processor to access the database and the representation of the network and conduct a search to identify in the network a continuous path from the user to the target person, wherein the continuous path begins at a node in the network that is associated with the user and ends at a node in the network that is associated with the target person, the continuous path traversing links from their first node to their second node, the continuous path termed a trust path, the presence or absence of such continuous path thereby providing an indication of the trustworthiness of the target person.

When one or more links expressing distrust terminate at the node represented by the target person, the system optionally includes a computer program product. The computer program product includes instructions operable to cause a programmable processor to access the database and the representation of the network and to conduct a search to identify in the network a continuous path from the user to one or persons expressing distrust of the target person. The presence of a continuous path provides an indication of the trustworthiness of the person expressing distrust of the target person.

In some embodiments, the identity of any one person associated with any one node of the plurality of nodes is concealed from all persons except those persons associated with nodes connected to the one node.

In some embodiments, the existence of any one link in the trust network is concealed from all persons except the person associated with the first node connected to that link.

In some embodiments, at least one the second node in the network serves also as a first node and is in turn connected to at least one other node in the network, thereby extending the network indefinitely.

In some embodiments, the database resides on a server, the computer program product resides on the server; one or more client devices are operably linked to the server; and the user interacts with the database and the computer program product through the client device.

In some embodiments, the database is distributed among a plurality of computers.

In some embodiments, the computer program product is distributed among a plurality of computers.

In some embodiments, one or more client devices is a computer, a telephone, or a portable electronic device.

In some embodiments, the linkage between the server and the client device is through the internet. In some embodiments, the user interacts with the database and the computer program product through the client device through web protocols.

In some embodiments, the representation of the plurality of nodes includes one or more attributes associated with one or more of the plurality of nodes.

In some embodiments, the computer program product uses the one or more attributes associated with the nodes included in the trust path to refine the indication of trustworthiness provided by the trust path.

In some embodiments, the computer program product uses the one or more attributes associated with one or more of the plurality of nodes to select a subset of the plurality of nodes which along with their connected links comprise a sub-network which becomes the domain for identifying the trust path.

In some embodiments, the representation of the plurality of links includes one or more attributes associated with one or more of the plurality of links.

In some embodiments, the computer program product uses the one or more attributes associated with the links included in the trust path to refine the indication of trustworthiness provided by the trust path. In some embodiments, the computer program product uses the one or more attributes associated with the one or more links to select a subset of the plurality of links which along with their connected nodes comprise a sub-network which becomes the domain for identifying the trust path.

In some embodiments an attribute associated with one or more of the plurality of links represents distrust and provides and explicit indication of lack of trustworthiness of the person associated with the second node of that link.

In some embodiments, the computer program product uses the nature of the trust path as at least part of the indication of trustworthiness.

In some embodiments, the computer program product uses the nature of the trust path in making the indication of trustworthiness.

In some embodiments, the computer program product uses the structure of the network as at least part of the indication of trustworthiness.

In some embodiments, the computer program product uses the structure of the network in making the indication of trustworthiness.

In some embodiments, the identity or personal information of the persons associated with at least one of the nodes is masked. In some embodiments, masking is by using an alias.

In some embodiments, the identity and personal information of the persons associated with the nodes are masked. In some embodiments, masking is by using an alias.

In some embodiments, an alias includes a unique personal identifier. In some embodiments, an alias includes a domain name and user name. In some embodiments, an alias includes a complete e-mail address. In some embodiments, an alias includes a trade name. In some embodiments, a unique identifier is provided for use as an alias for temporary use or for one-time-use.

Also provided by the invention is a system of expanding a representation of a trustworthiness network. The system includes a database, the database including a computer-readable representation of a network, the network representation comprising representations of a plurality of nodes and representations of a plurality of directed links, and representations of the connections of the nodes by the links. Each node in the plurality of nodes is associated with a person and each link in the plurality of links connects from a first node to a second node, the link being associated with a trusting relationship from a first person associated with the first node to a second person associated with the second node; and wherein the user is associated with at least one node in the plurality of nodes and the persons and their associations with nodes are represented in the database.

The system additionally includes a computer program product, the product comprising instructions operable to cause a programmable processor to input from a person not associated with an existing node in the network at least one alias and other information necessary for security purposes or for analytical purposes or for other purposes, create a representation of a node associated with the person in the network representation, input from a person associated with an existing first node on the network trustworthiness information for a person associated with an existing second node on the network and other information necessary for security purposes or for analytical purposes or for other purposes; and create a representation a of link between the existing first node associated with the first person and the existing second node associated with the second person, in the network representation, thereby expanding the trust network The system additionally includes insurance against legal claims arising from expressions of distrust captured as attributes of links in the trust network and a means for limiting expressions of distrust to terms that reduce the risk of legal liability to a level consistent with the nature of said insurance. [See questions above]

In some embodiments, the database resides on a server, the computer program product resides on the server, one or more client devices are operably linked to the server; and/or the user interacts with the computer program product through the client device.

In some embodiments, the database is distributed among a plurality of computers.

In some embodiments, the computer program product is distributed among a plurality of computers.

In some embodiments, at least one of the client devices is a computer, telephone, or portable electronic device.

The objects and advantages of the present invention are:

a) to provide for an objective evaluation of a person through a chain of real personal relationships in a social network using a formalized, standardized and consistent process for data acquisition and management and for network searching and evaluation;

b) to make an analysis of those relationships based on the known nature of a social network, which inherently will mitigate the impact of false information; and c) while not requiring a person to reveal their true identity to anyone beyond their present and immediate acquaintances and concealing the presence and nature of trusting relationships from all but the person who expresses the relationship.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In the case of conflict, the present specification, including definitions, will control. In addition, the materials, methods, and examples are illustrative only and not intended to be limiting.

Other features and advantages of the invention will be apparent from the following detailed description and claims.

DETAILED DESCRIPTION OF THE INVENTION

The social network is a collection of relationships, each between two people, which together form a connected network. The terminology of networks associate people with "nodes" and relationships with "links." (In the following description, the terms "link" and "relationship" are sometimes used interchangeably as are the terms "person" and "node.") The present invention uses a sub-network of the social network where each link denotes trust conferred on one person by another, a "trust network." While trust may be mutual, that is not always the case, so in a trust network links are "directed", that is, they lead from the person conferring trust to the person in whom trust is being conferred. Mutual trust is represented by two links leading in opposite directions. A trust network may be searched to find one or more "trust paths" between a starting point (representing a user wishing to evaluate a person) and an ending point (representing the person who is the target of the evaluation). Such a complete path indicates the presence of a complete chain of trusting relationships between the user and the target.

The presence of such a chain will not be sufficient by itself to establish with complete certainty the trustworthiness of a target, so the quality of the path will be a consideration. Quality can be assessed by a number of attributes of the path, one of which is length. All things being equal, a shorter path is to be preferred. Similarly, since personal relationships change over time, paths consisting of more recently created links might be preferred, though longstanding relationships, continuously updated, might also be considered favorable. Other attributes can be used to qualify a path.

The solution provided by the present invention recognizes that if one cannot know whom one is dealing with, at least in principle one may be able to learn, indirectly, whether or not they are likely to be trustworthy. Such an approach amounts to a formalization of the informal approach to validation, which makes use of the social network.

Figure 1:
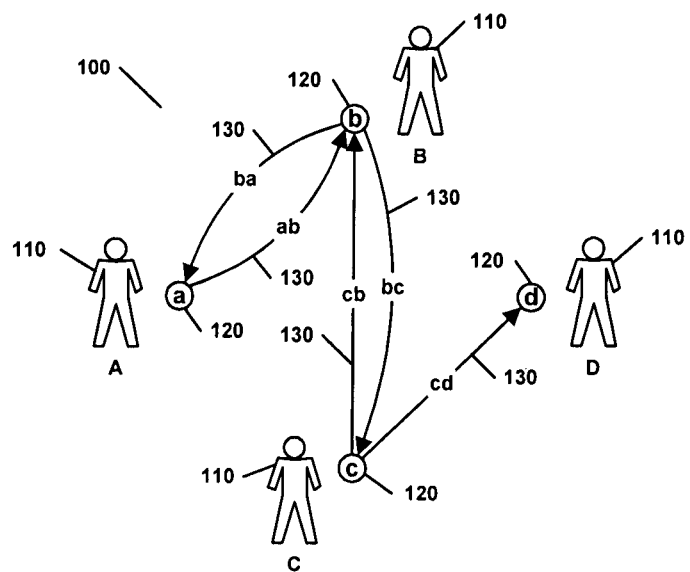
FIGS. 1 and 2 depict a sub-network of the social network among four persons.

FIG. 1 illustrates a simple sub-network of the social network, 100. The sub-network 100 involves four persons, 110. The upper case letters A, B, C and D designate the persons. The nodes, 120, and links, 130, represent the trust network among these persons. The full trust network extends beyond sub-network 100. A node designated with the same letter but in lower case represents each person (the lower-case letter in the node is an alias for the person). Thus, the node designated a represents the person designated A (i.e. a is an alias for A.) Links connect nodes and are directed as represented by an arrowhead and the symbolic name of the link. Thus the link designated with the symbolic name ba and with an arrowhead pointing at node a is directed from node b (first node) to node a (second node). In the context of the present invention link ba represents that person B considers person A trustworthy. Accordingly, link ab signifies that person A trusts person B. The sub-network depicted in FIG. 1 shows that person C trusts person D but that person D does not express trust in person C.

Though in sub-network 100 person A does not directly consider person D to be trustworthy, the trust path along links ab, bc and cd signifies that person B who is trusted by person A trusts person C and person C trusts person D. This path is depicted by shading in FIG. 2. If person A could discover this trust path, person A might conclude that he or she could reasonably treat person D as trustworthy.

Figure 2:
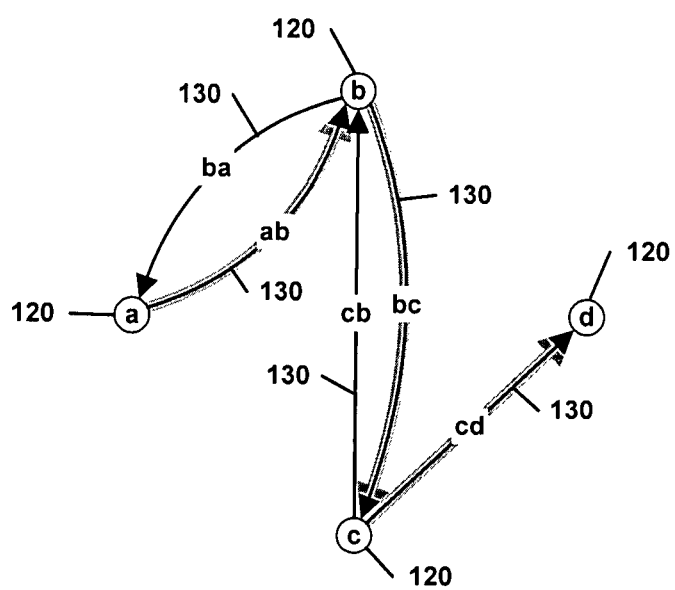
Figure 3:
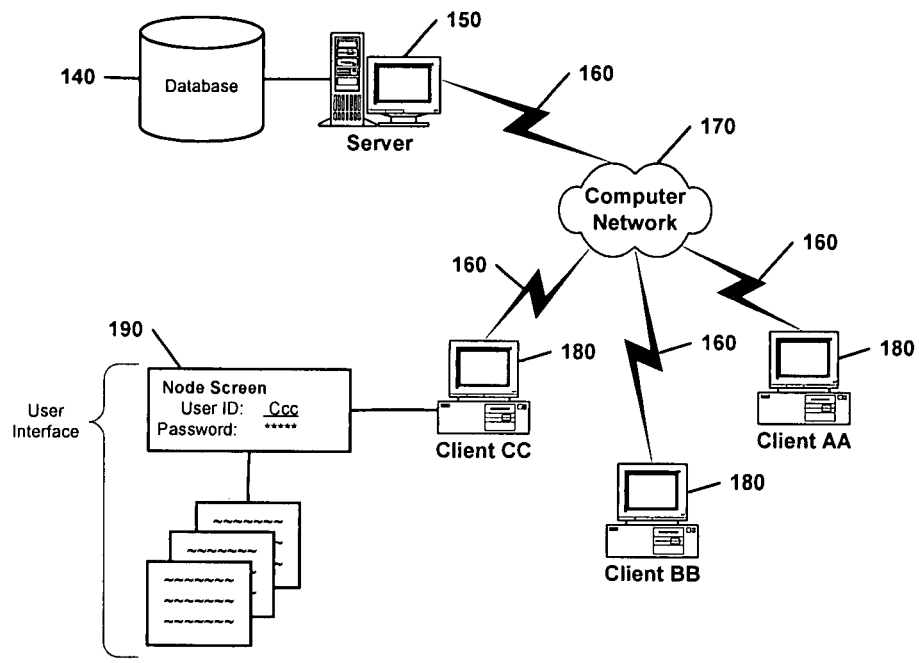
FIG. 3 depicts an exemplary system configuration using a server connected to client computers over a computer communication network.

The instant invention provides a method by which data can be collected and analyzed such that trust paths as depicted in FIG. 2 can be discovered without requiring the disclosure of one's identity or private information outside of existing acquaintances. One embodiment of the instant invention is described below. This embodiment is a system consisting of a computer database that contains data representing the trust network, and a set of computer programs that allow persons to enter data into the database describing their trusting relationships, and to conduct searches to discover trust paths. FIG. 3 depicts one configuration of this embodiment. The data describing the network are stored in one or more databases, 140, which are connected to one or more server computers, 150. The server computers are connected to a computer network such as the internet, 170, by a communications link, 160. A plurality of client devices, 180, are also connected to the computer network by communications links and may be logically connected through network 170 to the server using communication and security protocols. The client devices send and receive data from the servers, which in turn store and retrieve data in the database(s), execute computer programs, and return data to the client devices. The user would interact with the server through a user interface, 190, on one of the client devices. A suitable user interface could be a system of web pages. The client devices could be computers, telephones or some other electronic device capable of communicating with the server, directly or indirectly.

Figure 4:
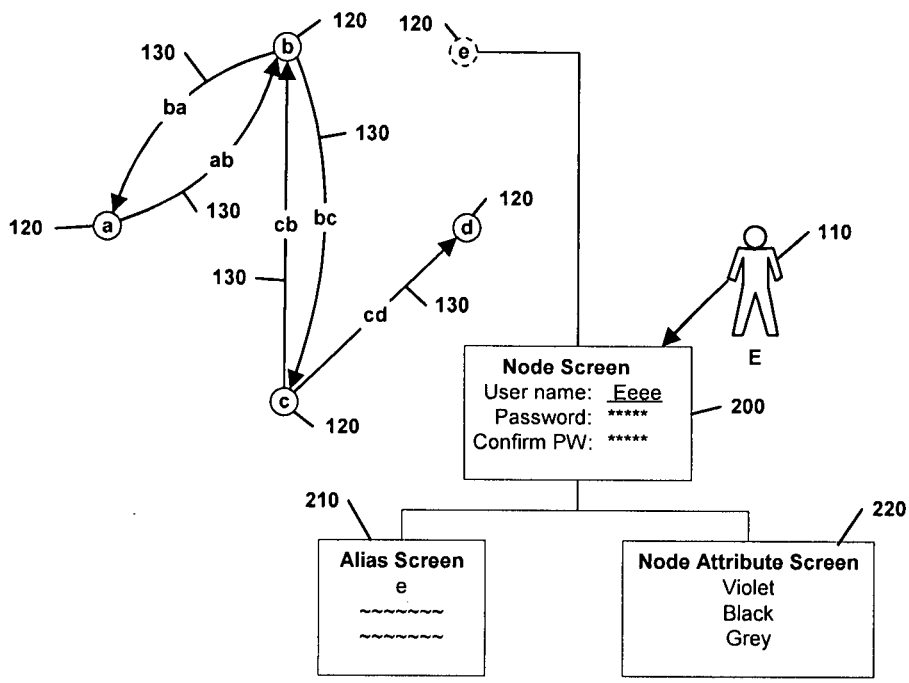
FIG. 4 depicts the node creation process

The representation of the social network includes data describing nodes, which represent persons, and links, which represent trusting relationships. FIG. 4 depicts the method that would be used to expand sub-network 100 to include a new node, e, representing a person, E. A person, 110, in this case person E, would use a computer interface referred to as a node screen, 200, to enter a user name (in this case Eeee, which is a private alias) and password. During the process of creating a node, the owner may enter one or more public aliases through an alias screen, 210, in this case e. The public alias(es) are used to identify the node to other persons. Successfully completing this process would cause the system to create a record in the database for node e representing person E. The system allows a person to reveal one or more of their public aliases to be used by others to reference nodes so as to create links or perform searches. The user may also be required or invited to enter additional information that might facilitate searching, such as the user's residence city or other attributes, through an attribute screen, 220. Access to all information associated with the node would be controlled by knowledge of the user name and the password or other security protocols.

A user is connected to the trust network by relationships to others, which in the instant invention are represented by links between the node that represents the user (first node) and nodes representing others (second nodes). In the instant invention, links are always created by the person expressing trust, that is, from the person represented by (and thus owning) the first node. Persons who wish to find trust paths to other persons would create links from their node to nodes owned by persons whom they trust. Persons who wish to have trusted paths to them discovered by others (say, for example, because they sell merchandise by way of an internet market and wish prospective customers to be able to establish their trustworthiness) would solicit trustworthy associates to create links to their node. (In the instant invention, users would think in terms of creating links between persons rather than nodes, but in the computer representation of the network a link connects two nodes, each of which represents a person.)

Aliases are used to mask the true identity of a person from all but his or her acquaintances. A user may employ many aliases. The only circumstance where a user must reveal their identity is when the user solicits an acquaintance to create a trust link to the user's node. Aliases can be any sort of unique personal identifier, including a domain name and user name, a complete e-mail address, a complete telephone number or a trade name. The use of identifiers commonly used in personal or commercial relationships provides considerable assurance to a user that they are indeed evaluating the person of interest. For example, an on-line vendor can offer their username (qualified by the domain, such as eBay) as an alias which a prospective buyer could use to evaluate the vendor. The system also provides validated, unique, one-time-use aliases to users at the request of target persons. These system-generated aliases are provided to the user by the system, which validates the authenticity of the target person through knowledge of a password or other validation protocol.

Figure 5:
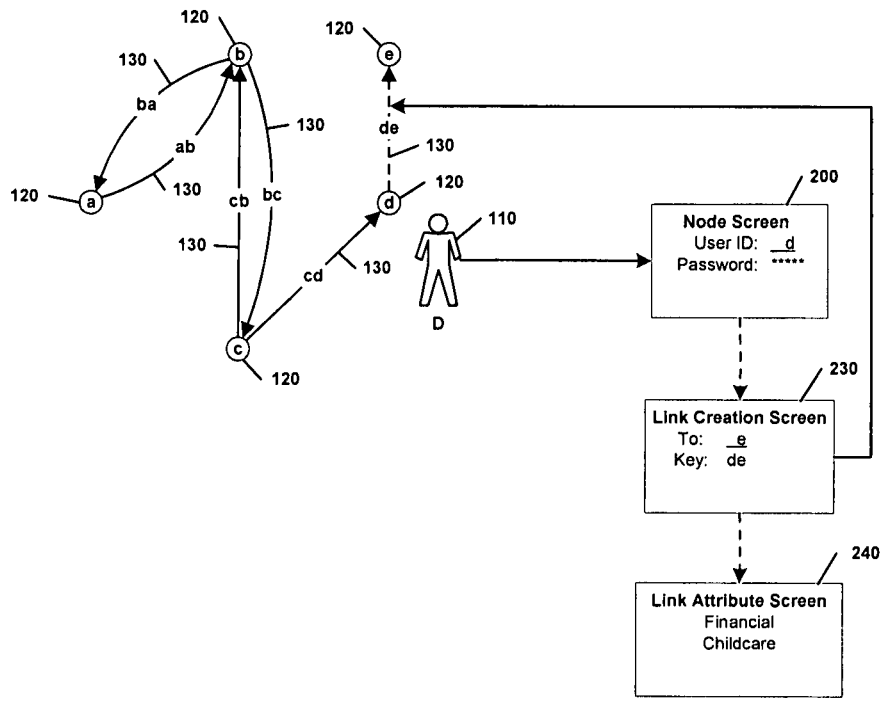
FIG. 5 depicts the link creation process.

In one embodiment, creation of a link requires only that the prospective owner of the link know one alias of the person to whom they wish to create the link. This is the only circumstance where the identity of a person must be associated with one of their aliases. The system could provide one-time-use aliases for this purpose. FIG. 5 depicts the process of creating a link. Person D logs in to their node screen, 200, and then uses an interface designated as the link creation screen, 230. On the link creation screen person D enters an alias for person E, in this case e, and a symbolic name for future use in referring to the link, in this case de. Once these data have been entered and validated, the system creates a link, in this case the link designated as de. If the system provided for it, the owner would enter any attribute information for the link at this time using the link attribute screen, 240. For example, the system might encourage or require the entry of information that could qualify the relationship. In FIG. 5, person D has qualified their trust in person E in two contexts: financial and childcare. The link owner could review and revise the links they have created by logging in to their node information page and from there using a user interface designated as the link maintenance screen (not depicted). On the link maintenance screen would be a list of the symbolic names of links representing trusting relationships to other people along with pertinent data associated with those links. The system might require that links be updated or confirmed at some frequency.

In this embodiment a person who wishes to have links created to them may solicit others to create these links and must provide one of his or her aliases (or an alias provided by the system) for use in the link creation process. Information such as aliases and solicitations can be passed between persons outside of the system, though provision for such communication could be provided in the system itself. In one variant, the link creation process could require that the owner of the second node assent to creation of the link.

Figure 6:
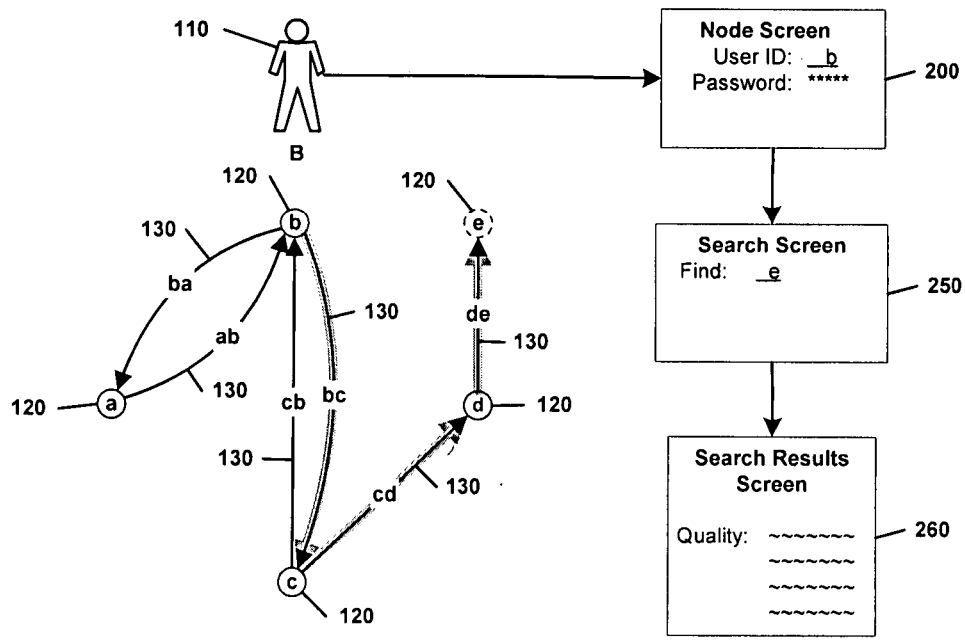
FIG. 6 depicts the network search process.

The system would provide the ability for a user to discover a trust path from himself or herself to another person (the target person). In order to conduct a search the user would be required to know one alias for the target person and might be requested or required to enter other parameters for the search. The search process is depicted in FIG. 6. Person B wishes to learn if there is a trust path to Person E. In this embodiment, person B begins by logging in to his or her node screen, 200, from where the search screen, 250, can be reached. On the search screen person D enters an alias for person E, in this case e, and any other parameters required by the system for the search (collectively the search specification). The system transmits the search specification to the server, which uses a network search algorithm to discover continuous paths through the network from node b to node e. There exist many network search algorithms that could be used to effect such a search. In this example one such path exists consisting of links bc, cd and de, which are shaded in FIG. 6. The system returns the results of the search to the user on the search results screen, 260.

The search results screen would report at a minimum the presence or absence of one or more trust paths from the user to the target. Since an exhaustive search of every possible path to a target would likely be impractical for large networks, the system could require the user to set an upper limit on the depth of the search (in terms of the number of links traversed) and would have its own absolute limit. Depending on the implementation, the user could be presented with information on the quality of the path or paths found, as discussed below.

A person who wishes to be the target of searches would provide, either privately to a single person or publicly, one or more aliases associated with their node. The instant invention allows the search to be carried out and trust paths discovered without the searcher knowing more about the target than one alias. Neither a person's real identity nor any other private information need be disclosed to a searcher. The only persons who are required to know the target's identity are his or her acquaintances who were solicited to provide references (i.e. create links).

More links from a person make it more likely a trust path can be found from that person to another target. This fact serves as an incentive for persons to enter links to associates. The desire of a user to avoid obtaining false positive trust paths acts as a check against establishing links to associates who are not actually trusted. (The private nature of this system means that a user who asks an associate to establish a link to them cannot determine from the system alone if in fact that link has ever been established.)

Figure 7:
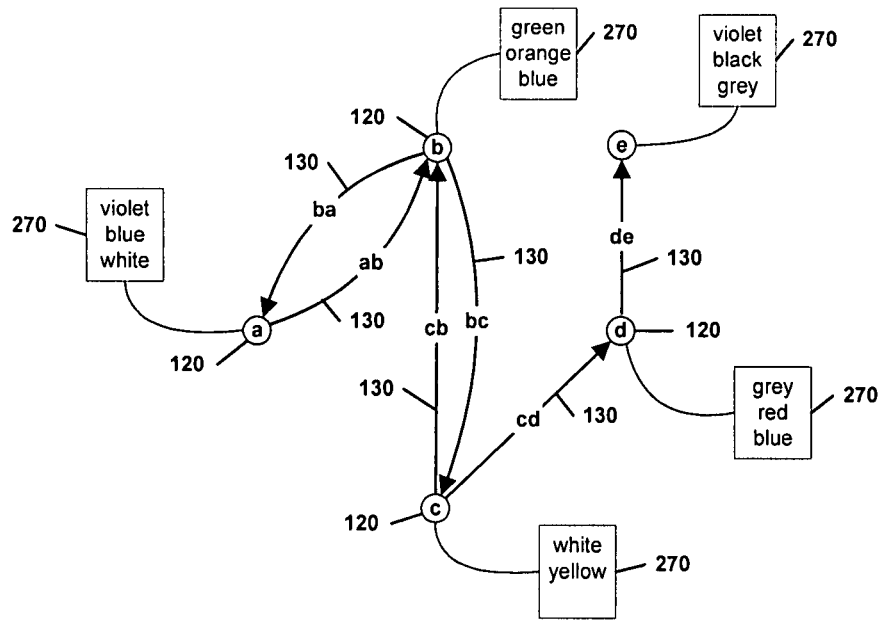
FIG. 7 depicts node attributes.
Figure 8:
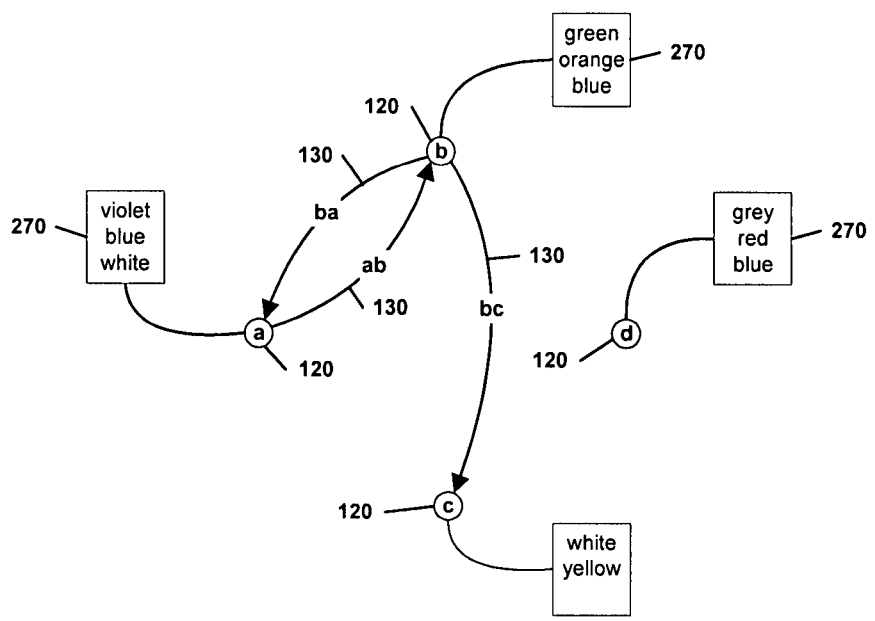
FIG. 8 depicts a sub-network defined by a specific context.

When nodes and links are created, their owner may be offered the option to enter attributes that qualify the node or link. FIG. 7 depicts some node attributes, 270, applied to sub-network 100. Attributes on nodes or links can be used to define the context for a search for a trust path, or to qualify the search results. Node attributes can be used to set the context of which persons the searcher wishes included in any trust path. For example, members of a civic group or church could choose to limit trust paths to those passing through members of their group or church (even when trying to evaluate someone from outside the group). FIG. 8 depicts what sub-network would result if only the nodes of sub-network 100 with the attribute blue were included. In FIG. 8, node c does not have the attribute blue, but it can be reached by link bc from node b which does have attribute blue. This signifies that person C is trusted by a person with attribute blue. Node d has attribute blue and is included in the sub-network but cannot be reached by a link from a node with attribute blue. This signifies that no person with attribute blue has expressed trust directly in person D. Attributes assigned to links can be used in a similar manner to set the context in which trust is expressed. In FIG. 5 person D assigned attributes childcare and financial, which define the context in which person E is held to be trustworthy by person D. One special class of attributes expresses distrust. Whereas the lack of a trust path (or at least a trust path with certain minimum characteristics) leading to a target is a presumptive indication of untrustworthiness, the presence of a link to the target node with a link attribute indicating distrust is an explicit indication of untrustworthiness. This explicit indication of untrustworthiness can be propagated further through the network on the basis that trust expressed by an untrustworthy person also indicates untrustworthiness, or the links leading from an untrustworthy person can be excluded from the subnetwork. The trustworthiness of a person expressing distrust of a target can be evaluated by using the network as described above.

Figure 9:
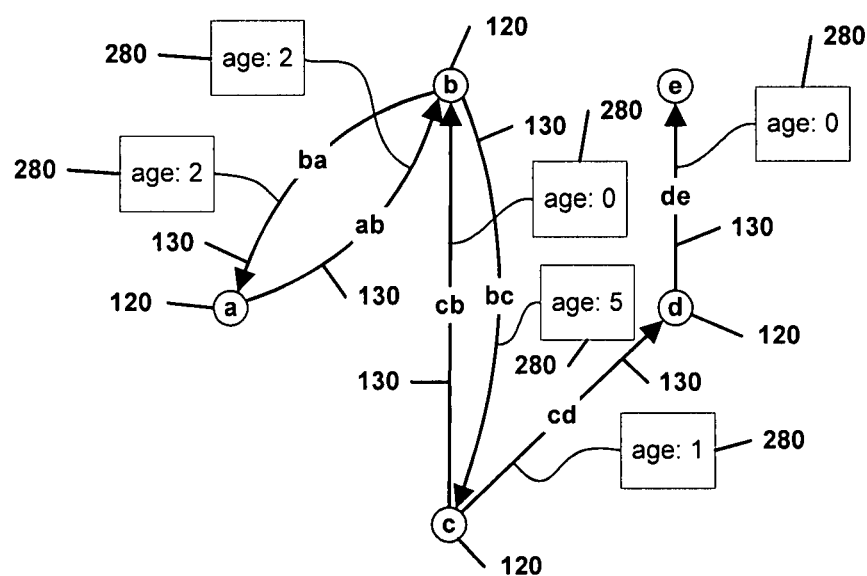
FIG. 9 depicts link attributes.

Attributes can be managed or created by the system or entered freely by users. Some attributes, such as a node attribute reflecting membership in a group, could be formalized and validated by the system or by cooperating systems. Some attributes might be created by the system itself. FIG. 9 depicts sub-network 100 with each link assigned an attribute, 280, which represents its age (time since its creation.) For example, users might consider older links less reliable than newer links and the search process could qualify the results of the search based on the age of links in the trust paths that are detected. Search results could also be qualified based on node attributes. The structure of the network itself could also be used to qualify search results. For example, a person who has expressed trust in an excessively large number of people might be considered less trustworthy as a result.

What is claimed is:

1. A system for evaluating the trustworthiness of a target person by a user, the system comprising a database comprising a computer-readable representation of a network, said network representation comprising representations of a plurality of nodes and representations of a plurality of directed links, and representations of the connections of said nodes by said links, wherein each node in said plurality of nodes is associated with a person and each directed link in said plurality of links connects from a first node representing a first person to a second node representing a second person, said directed link being associated with a trusting relationship from said first person associated with said first node to said second person associated with said second node; and wherein said user is associated with at least one said first node in said plurality of nodes and said persons and their associations with nodes are represented in said database, wherein the existence of each link in the network is concealed from all persons except the person associated with the first node connected to that link; and a programmable processor operable to implement a computer program product, wherein said processor provides access to said database and said representation of said network, and identification in said network of a continuous path from said user to said target person, wherein said continuous path begins at a node in said network that is associated with said user and ends at a node in said network that is associated with said target person, said continuous path traversing links from their first node to their second node, said continuous path termed a trust path, thereby providing an indication of the trustworthiness of said target person.

2. The system of claim 1, wherein the identity of any one person associated with any one node of said plurality of nodes is concealed from all persons except those persons associated with nodes connected to said one node.

3. The system of claim 1, wherein at least one said second node in said network serves also as a first node and is in turn connected to at least one other node in said network, thereby extending the network indefinitely.

4. The system of claim 1, wherein
said database resides on a server,
said computer program product resides on said server;
one or more client devices are operably linked to said server; and
said user interacts with said database and said computer program product through said client device.

5. The system of claim 1, wherein said database is distributed among a plurality of computers.

6. The system of claim 1, wherein said computer program product is distributed among a plurality of computers.

7. The system of claim 4, wherein one or more client devices is a computer.

8. The system of claim 4, wherein one or more client devices is a telephone.

9. The system of claim 4, wherein one or more client devices is a portable electronic device.

10. The system of claim 4, wherein said linkage between said server and said client device is through the internet.

11. The system of claim 4, wherein said user interacts with said database and said computer program product through said client device through web protocols.

12. The system of claim 1, wherein in said representation of said plurality of nodes one or more attributes are associated with one or more of said plurality of nodes.

13. The system of claim 12, wherein said computer program product uses said one or more attributes associated with the nodes included in said trust path to refine the indication of trustworthiness provided by said trust path.

14. The system of claim 12, wherein said computer program product uses said one or more attributes to select a subset of said plurality of nodes which along with their connected links comprise a sub-network which becomes the domain for identifying said trust path.

15. The system of claim 1, wherein in said representation of said plurality of links one or more attributes are associated with one or more of said plurality of links.

16. The system of claim 15, wherein said computer program product uses said one or more attributes associated with the links included in said trust path to refine the indication of trustworthiness provided by said trust path.

17. The system of claim 15, wherein one of said attributes associated with one or more of the said links included in said trust path represents distrust and provides an explicit indication of lack of trustworthiness for the person associated with the second node of that link.

18. The system of claim 15, wherein said computer program product uses said one or more attributes associated with said one or more links to select a subset of said plurality of links which along with their connected nodes comprise a sub-network which becomes the domain for identifying said trust path.

19. The system of claim 1, wherein said computer program product uses said trust path as at least part of said indication of trustworthiness.

20. The system of claim 1, wherein said computer program product uses said trust path in making said indication of trustworthiness.

21. The system of claim 1, wherein said computer program product uses said network as at least part of said indication of trustworthiness.

22. The system of claim 1, wherein said computer program product uses said network in making said indication of trustworthiness.

23. The system of claim 1, wherein the identity or personal information of the person associated with at least one of said nodes is masked.

24. The system of claim 23, wherein masking is by using an alias.

25. The system of claim 24, wherein said alias includes a unique personal identifier, a domain name and user name, an email address, or a trade name.

26. The system of claim 24, wherein said alias is provided automatically for temporary use or one-time use.

27. The system of claim 1, wherein the identity and personal information of the person associated with said nodes are masked.

28. The system of claim 27, wherein masking is by using an alias.

29. The system of claim 28, wherein said alias includes a unique personal identifier, a domain name and user name, an email address, or a trade name trade name.

30. The system of claim 28, wherein said alias is provided automatically for temporary use or one-time use.

31. A system of expanding a representation of a trustworthiness network, the system comprising
a database comprising a computer-readable representation of a network, said network representation comprising representations of a plurality of nodes and representations of a plurality of directed links, and representations of the connections of said nodes by said links,
wherein each node in said plurality of nodes is associated with a person and each directed link in said plurality of links connects from a first node representing a first person to a second node representing a second person, said link being associated with a trusting relationship from said first person associated with said first node to said second person associated with said second node; and
wherein said user is associated with at least one said first node in said plurality of nodes and said persons and their associations with nodes are represented in said database,
wherein the existence of each link in the trustworthiness network is concealed from all persons except the person associated with the first node connected to that link;
a programmable processor operable to implement a computer program product, wherein said processer
obtains input from a person not associated with an existing node in said network providing at least one alias and other information necessary for security purposes or for analytical purposes or for other purposes creates a representation of a first node associated with said person in said network representation;

obtains from a person associated with an existing first node on said network trustworthiness information for a person associated with an existing second node on said network and other information necessary for security purposes or for analytical purposes or for other purposes; and creates a representation a of link between said existing first node associated with said first person and said existing second node associated with said second person, in said network representation, thereby expanding said trust network.

32. The system of claim 31, wherein said database resides on a server.

33. The system of claim 31, wherein said computer program product resides on said server.

34. The system of claim 33, wherein one or more client devices are operably linked to said server and said user interacts with said computer program product through said client device.

35. The system of claim 31, wherein said database is distributed among a plurality of computers.

36. The system of claim 31, wherein said computer program product is distributed among a plurality of computers.

37. The system of claim 34, wherein at least one of said client devices is a computer.

38. The system of claim 34, wherein at least one of said client devices is a telephone.

39. The system of claim 34, wherein at least one said client device is a portable electronic device.

40. The system of claim 34, wherein linkage between said server and said client device is through the internet.

41. The system of claim 31, wherein said user interacts with said computer program product through said client device through web protocols.

* * * * *